March 26, 1968  B. B. STRANGE ETAL  3,374,852
HYDROPHONE SUSPENSION SYSTEM FOR MAINTAINING HYDROPHONE
FOR A PRESELECTED DEPTH
Filed Sept. 8, 1965
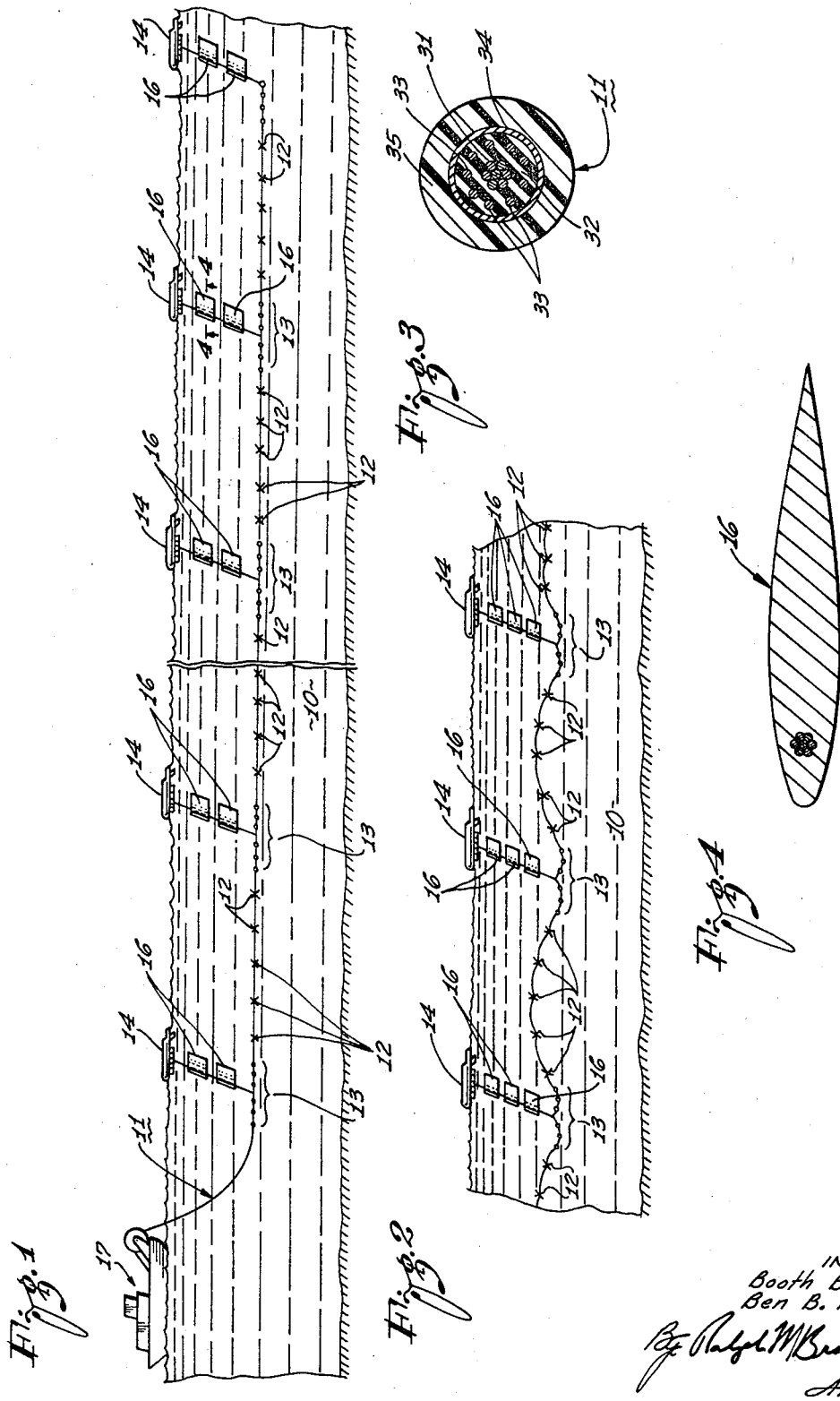
INVENTORS:
Booth B. Strange
Ben B. Thigpen
Attorney

3,374,852
HYDROPHONE SUSPENSION SYSTEM FOR MAINTAINING HYDROPHONE FOR A PRESELECTED DEPTH

Booth B. Strange and Ben B. Thigpen, Shreveport, La., assignors to Western Geophysical Company of America, Los Angeles, Calif.
Filed Sept. 8, 1965, Ser. No. 485,896
1 Claim. (Cl. 181—.5)

ABSTRACT OF THE DISCLOSURE

A hydrophone suspension system for maintaining hydrophones at a uniform depth is provided which includes a positive buoyancy cable for supported plurality of spaced hydrophones. Weights are spaced along the cable to provide a negative buoyancy for the cable and weights. A plurality of floats are provided which are connected to the cable adjacent to the aforesaid weights to provide a net positive buoyancy for the entire suspension system.

---

This invention relates to marine seismography, and more particularly, to an easily towable and relative noise-free hydrophone suspension system for use in marine seismography.

In marine seismic surveying, it is customary to tow an array of hydrophone groups behind a ship, to stop the ship at predetermined intervals to permit the hydrophones to become still in the water, to detonate an explosive charge or otherwise initiate a seismic shock at a point removed from the array and to record disturbances produced by the shot or shock and detected by the hydrophone group by means of a recording device on the tow ship.

Alternatively, the ship may continue in uniform forward motion but cause the cable alone to stop in the water by paying out cable at a speed equal to that of the ship. The cable is reeled in during travel between shot points.

In a typical operating system employing such a technique, a number of hydrophones are attached to a cable which is towed through the water by a recording vessel. Cables as much as two miles in length with twenty-four hydrophone groups distributed along their length may be used. With such a system, each shot may produce twenty-four records of the reflections of the seismic shock from the subsurface geological formations disposed beneath the surface of the water. This permits the determination of the slope or tilt of the formations along the line of the cable as disclosed, for example, in Booth B. Strange, Patent No. 3,133,262, granted May 12, 1964.

A variety of hydrophone detector and cable suspension arrangements are known which are designed to permit ease of towing and reeling by the ship and to allow the hydrophones to reach a preselected equilibrium depth below the surface of the water soon after the towing ship stops and slacks off on the cable.

The primary desiderata of such hydrophone suspension arrangements are low towing friction or drag, freedom from twisting and tangling while under tow, ease of reeling off and on ship, rapid and reliable attainment of hydrophone equilibrium depths, and a high degree of isolation of the hydrophone detector group from surface noise. Considerable difficulty has been experienced in achieving adequate performance with the very long cables now required by the art.

In early attempts to position a string of hydrophones for marine seismic surveying, it was found that hydrophones which were located at the surface of the water gave unsatisfactory results because of the surface noises generated by wave action and by the wave-slap on the cable. It was understood that to get satisfactory results from a cable with spaced hydrophone groups distributed along its length, it was necessary that the hydrophones be in a predetermined depth zone below the surface of the water.

An early system utilized a nonfloatable, unitary tow cable which was kept in a horizontal position beneath the surface of the water by the velocity of the towing ship. Undesirable noise was, however, unavoidably produced by the vertical components of motion of the hydrophones in the water, which vertical movements are read by the hydrophones as changes in pressure. At practical ship speeds, these motions produce noises at frequencies within the normal exploration seismic range of 5–100 cycles per second. It was also found difficult to apply this system to long cables due to their tendency to sink to depths at which water pressure damaged the hydrophones or the electrical circuits carried by the cable. Other prior art arrangements included a buoyant towing cable and various methods of suspending the hydrophone groups from the buoyant towing cable so that they would remain suspended at a predetermined distance beneath the surface of the water and in proper horizontal relationship to each other after the tow ship stopped its motion.

These suspension methods, of necessity, employed some form of branch cables which hung vertically from the buoyant cable to suspend the hydrophone members. Improved versions connected the hydrophone groups to prevent tangling and random motion. These dual cable arrangements were, however, difficult to reel aboard ship and were in general subject to tangling. Such arrangements also were characterized by a high drag resistance because of the type of branch cable configuration. This, of course, reduced the ship's speed and increased operating costs. It also increased the difficulty of paying out and retrieving the cable. A further disadvantage, not as clearly recognized the art, is that seismograms made with high-drag cables include undesirable amounts of noise which may be due to excessive coupling of the cable to eddies within the water. Residual noise from this and other sources has assumed great importance with the increased interest in resolving problems associated with ever greater depths of exploration interest.

Unitary cables have been used in which spaced hydrophone groups are attached to weighted cable sections while supporting floats are attached at intermediate points. When such a cable is under tow, tension causes it to stretch out and the weighted sections rise from their equilibrium depths. When the tow is stopped for a shot, a time interval must be allowed for the hydrophones to sink to their equilibrium depths and for the cable to assume the desired configuration in the water. It will be readily appreciated that with very long cables the time required for the equilibrium configuration to be achieved can be appreciable. Furthermore, it will be apparent that the "settling time" increases with the operating depth of the hydrophones. In general, the time required for a unitary hydrophone cable to reach equilibrium at depths below about 25 feet is excessive. Many cases arise, however, in which operating depths of about 50 feet are desired. Inasmuch as a marine seismic crew may require about two minutes to travel between successive shot points, it can be seen that the cable settling time can account for a significant part of the cost of the survey. A settling time of 30 seconds, for example, can increase the time between shots by 25% and hence increase the cost of the survey in the same proportion.

Neutral buoyancy cables constitute another approach to maintaining hydrophones at uniform depths during marine seismic surveying operations. These are normally towed from a buoy and depressor unit which places the leading end of the cable at a fixed depth. A major difficulty encountered in the use of neutral buoyancy cables arises from the fact that, due principally to temperature and salinity fluctuations, the density of seawater is subject to local variations so that portions of a long cable may tend at one point to sink and at another point to rise, resulting in an undesirable non-uniform depth distribution of the hydrophones. This difficulty is further aggravated by leakages, wear and tear, and other mechanical changes normally encountered in use. As a practical matter, neutral buoyant cables supported only at the lead end are unusable at lengths substantially greater than about 3,000 feet. A related disadvantage is that excessive pressure encountered in the course of a cable excursion to greater than operating depths may damage a portion of the cable, causing a loss of flotation which pulls still more of the cable down. In this manner, loss of the entire cable may result.

An object of the present invention is to isolate the hydrophone groups recording seismic signals from interfering noise signals caused by surface wave motion and turbulence while keeping the hydrophones at a preselected depth beneath the surface of the water.

A further object of the present invention is to provide a hydrophone cable which will not be subject to sinking because of the effects of hydrostatic pressure on the cable.

An additional object is to provide a hydrophone cable which will suspend a string or spread of hydrophones spaced along its length at a predetermined and relatively uniform depth below the surface.

A further object of the present invention is to provide a hydrophone cable which will reliably suspend a string of hydrophones at a predetermined depth and will be easily towable by a ship as well as being relatively easy to reel aboard ship.

In accordance with the principles of the invention, an illustrative embodiment comprises a hydrophone cable characterized by a positive buoyancy and having a plurality of spaced hydrophone groups mounted thereon. The combination of cable and hydrophones has a net positive buoyancy and tends to float in the water. Attached to the cable at spaced points separated by one or more groups of hydrophones are weights sufficient to overcome the positive buoyancy of the cable and hydrophones, imparting to the whole a negative buoyancy. The cable with weights and hydrophones is supported in the water by a plurality of surface floats, one of which is attached at each point where the cable weights are carried.

In a preferred embodiment of the invention, the positive buoyancy of the cable is provided by a waterproof and relatively incompressible cable jacket of an expanded plastic material. The jacket is uniformly distributed over the cable to provide a streamlined configuration which greatly reduces drag from that experienced with cables using lumped floats. The streamlined cable also creates less turbulence as it moves through the water than do cables with discrete floats. To still further streamline the system, the support cables connecting the hydrophone cable to the surface floats are faired, i.e. supplied with longitudinal stabilizing members having cross-sections generally similar to an airfoil.

The above mentioned as well as other objects, features and advantages of the invention will be fully understood from the following more detailed description taken in conjunction with the accompanying drawing in which:

FIGURE 1 depicts a hydrophone and cable assembly embodying the invention, under tow by a vessel;

FIGURE 2 depicts a portion of the cable shown in FIGURE 1 in a configuration assumed a short time after the towing tension is released;

FIGURE 3 shows a cross-section of a tension and conductor cable useful in the invention; and FIGURE 4 is a cross-sectional view of a faired support cable employed in the embodiment illustrated in FIGURE 1.

Referring now to the drawing, there is shown in FIGURE 1 a preferred type of marine seismic cable system 10 embodying the principles of this invention. The system 10 comprises a tension and conductor cable 11 to which there are attached a plurality of spaced hydrophones 12. A plurality of weights 13 are also attached to the cable at points intermediate and spaced from groups of hydrophones 12. The cable 11 with attached hydrophones 12 and weights 13 is supported in a body of water by a plurality of surface floats or buoys 14, one of which is attached by a support member 16 to the cable 11 at each point where weights 13 are attached. The entire cable system 10 is towed through the water by a ship 17.

The tension and conductor cable 11 is characterized by a substantially distributed positive buoyancy in the body of water through which the hydrophone system 10 is towed. Typically, the hydrophones 12 exhibit a negative buoyancy. It is characteristic of the invention, however, that the combination of the cable 11 and hydrophones 12 has a net positive buoyancy so that this portion of the system alone would tend to float. This positive buoyancy is more than compensated by the negative buoyancy of weights 13 so that the combination of cable 11, hydrophones 12 and weights 13 has a negative buoyancy and tends to sink.

Positive buoyancy is imparted to the system as a whole by the surface floats 14 which, in conjunction with support members 16, form the only connection between cable 11 and the surface of the body of water which is more or less constantly in motion and disturbed by the action of wind and waves. The response of buoys 14 to the up and down motion of the water surface is damped somewhat by the inertial mass of weights 13 suspended directly below. Isolation of hydrophones 12 from surface disturbances is principally achieved, however, by virtue of the configuration assumed by cable 11 when the vessel 17 releases the towing tension. This configuration is depicted in FIG. 2 from which it can be seen that the positive buoyancy of the cable sections intermediate the weights 13 causes them to rise in a series of gentle arcs interrupted by shallow depressions resulting from the localized negative buoyancy of hydrophones 12. This compound series of arcs acts as an efficient mechanical filter which drastically attenuates the transmission of surface induced disturbances along the cable from the points of attachment to support members 16 and buoys 14.

It will be appreciated from a comparison of FIG. 1 and FIG. 2 that cable system 10 is, while under tow, very nearly in its operating configuration so that there is no necessity for allowing an extended settling time. Thus, each seismic shot may be detonated and recorded almost immediately after towing vessel 17 has slacked off on the cable.

The positive buoyancy of cable 11 is sufficient to cause the unweighted cable section between the points where buoys 14 are attached to rise slowly whenever the towing tension is released. As a result, hydrophone cable systems embodying the invention are not affected with the difficulties arising from the ambiguous responses of neutral buoyancy cables. The tendency of the unweighted cable sections to rise toward the surface is restrained somewhat by weights 13 and by the fact that the distance between the weights must become shorter to allow the unweighted sections to form the desired arcs. Therefore, the arc configuration, which begins to form as soon as the cable is slack, changes slowly over a period of time from a series of slight arcs to a series of more pronounced arcs. As a result, the cable configuration remains in the desired range for a period which may be as long as several minutes or more. This is considered advantageous since, while the cable is ready for the shot almost as soon as the tow is stopped, it remains in a state of readiness should an unforeseen delay occur.

A further advantage of the invention is that there is never—short of castastrophic failure of several support members 16—any tendency for portions of cable 11 to sink below operating depth as it is positively buoyant. Thus, the risk of cable damage or loss due to damage of the cable flotation equipment by excessive hydrostatic pressure is substantially eliminated.

In the preferred embodiment of the invention, the substantially distributed positive buoyancy of cable 11 is provided by a jacket of a relatively incompressible, waterproof material having a density appreciably less than that of seawater. Expanded or foamed plastic materials, such as expanded polyethylene, have been used successfully. A cross-section of a typical cable constructed in accordance with this aspect of the invention is shown in FIG. 3. Cable tension is borne by a central stress member 31 which may comprise a braided or twisted, non-rotatable steel rope. Surrounding stress member 31 are a plurality of insulated conductors 33 for connecting hydrophones 12 to recording instruments aboard vessel 17. It may be desirable to embed conductors 33 in a layer 32 of a material such as synthetic rubber in order to protect them against damage due to abrasion or rough handling. Conductor-bearing layer 32 is, in the preferred embodiment, covered by a waterproof sheath 34 as additional protection. A flotation jacket 35 of expanded plastic completes cable 11.

The use of a uniformly distributed flotation jacket 35 streamlines cable 11 to a degree not achieved heretofore, with the unanticipated result of lower noise in seismic records made with system 10. It is believed that the noise reduction is due at least in part to a decrease in the response of the smoothly sheathed cable to turbulence in the water, as compared to the response of discrete or lumped floats.

A further contribution to streamlining of system 10 is the use of fairing on support members 16 to provide longitudinal stabilization and generally to smooth the passage of the support members through the water. A cross-section of the fairing, which resembles an airfoil, is shown in FIG. 4. In the interest of easier handling and stowing aboard ship, the fairing is segmented as depicted in FIGS. 1 and 2.

By eliminating any tendency of support members 16 to whip or oscillate while system 10 is moving through the water, and by reducing turbulence through streamlining flotation jacket 35, sources of undesirable noise may be reduced to such an extent that it is not absolutely necessary to wait until the hydrophone spread is still in the water before recording a shot. Recording may be done within 30 seconds of the time that vessel 17 stops its engines and slacks off on the cable, which may continue to move somewhat under its own inertia. As an added advantage of the streamlining of the cable of the present invention, it has been found that merely slowing the ship by stopping the engines is sufficient to produce slack in the cable because the resistance of the ship in the water is greater than that of the cable. In prior art systems it was necessary to back the ship down to achieve slack.

A further advantage of the high degree of streamlining of system 10 is that drag is greatly reduced, enabling the cable to be towed faster and thereby reducing the time between shots. The savings in time and fuel costs, elimination of the need to reverse the ship motion at each station, combined with the inherent low-noise design make the invention economically, as well as technically, attractive.

A typical system embodying the invention comprised a tension and conductor cable having a flotation jacket of expanded polyethylene which provided a substantially distributed positive buoyancy of about 15 grams per foot of cable. Twenty-four hydrophones, each comprising four five-pound detectors spaced forty feet apart, were attached to the cable with the groups being set on centers about 100 meters apart. The overall length of the cable was 2300 meters. Five surface buoys were used, each having a positive buoyancy of about 250 pounds. Weights attached to the cable at each point of buoy attachment weighted about 100 pounds. In the preferred arrangement, the weights took the form of six 15-pound masses spaced eight feet apart, the group being centered on the buoy coupling.

The signal-to-noise ratio of seismic records made with this cable was improved by a factor of 10 over that of records made with prior art cables under similar circumstances. Excellent results were obtained when shots were made shortly after the towing vessel stopped its engines and released the tension on the cable. With prior cables, on the other hand, it was necessary to reverse engines and to allow the cable to become still in the water before recording a shot. Since the cable is at its operating depth when the tension is released, there is no need to wait for it to settle into the desired configuration.

Although the invention has been described by reference to a specific illustrative example, many modifications and variations are possible and may be made by those skilled in the art without departing from its scope and spirit.

What is claimed is:

1. A hydrophone suspension system adapted for towing by a vessel through a body of water, said system including,
   a tension and conductor cable, said cable having means imparting thereto when in said body of water a uniformly distributed positive buoyancy;
   a plurality of groups of hydrophones suitably positioned throughout the length of said cable and connected to conductors in said cable, said plurality of hydrophones being characterized by a net negative buoyancy of magnitude less than the positive buoyancy of said cable;
   a plurality of weights attached to said cable at points intermediate and spaced from said groups of hydrophones, each weight comprising a group of discrete weights spaced along a section of said cable, the net negative buoyancy of said weights being greater in magnitude than the positive buoyancy of the combination of said cable and said hydrophones;
   a plurality of surface floats, the positive buoyancy of said floats being greater in magnitude than the combined negative buoyancy of said cable, hydrophones, and weights;
   means for attaching said surface floats to said cable near points of attachment of said weights; and
   said floats being effective to cause sections of said cable intermediate said weights to rise with respect to said weights when towing tension is removed from said cable in said body of water.

References Cited

UNITED STATES PATENTS

| | | | |
|---|---|---|---|
| 2,610,240 | 9/1952 | Pottorf | 340—7 |
| 2,652,550 | 9/1953 | Lash | 340—7 |
| 2,729,300 | 1/1956 | Paslay et al. | 181—.5 |
| 3,287,691 | 11/1966 | Savit | 340—7 |

BENJAMIN A. BORCHELT, *Primary Examiner.*

W. KUJAWA, *Assistant Examiner.*